UNITED STATES PATENT OFFICE.

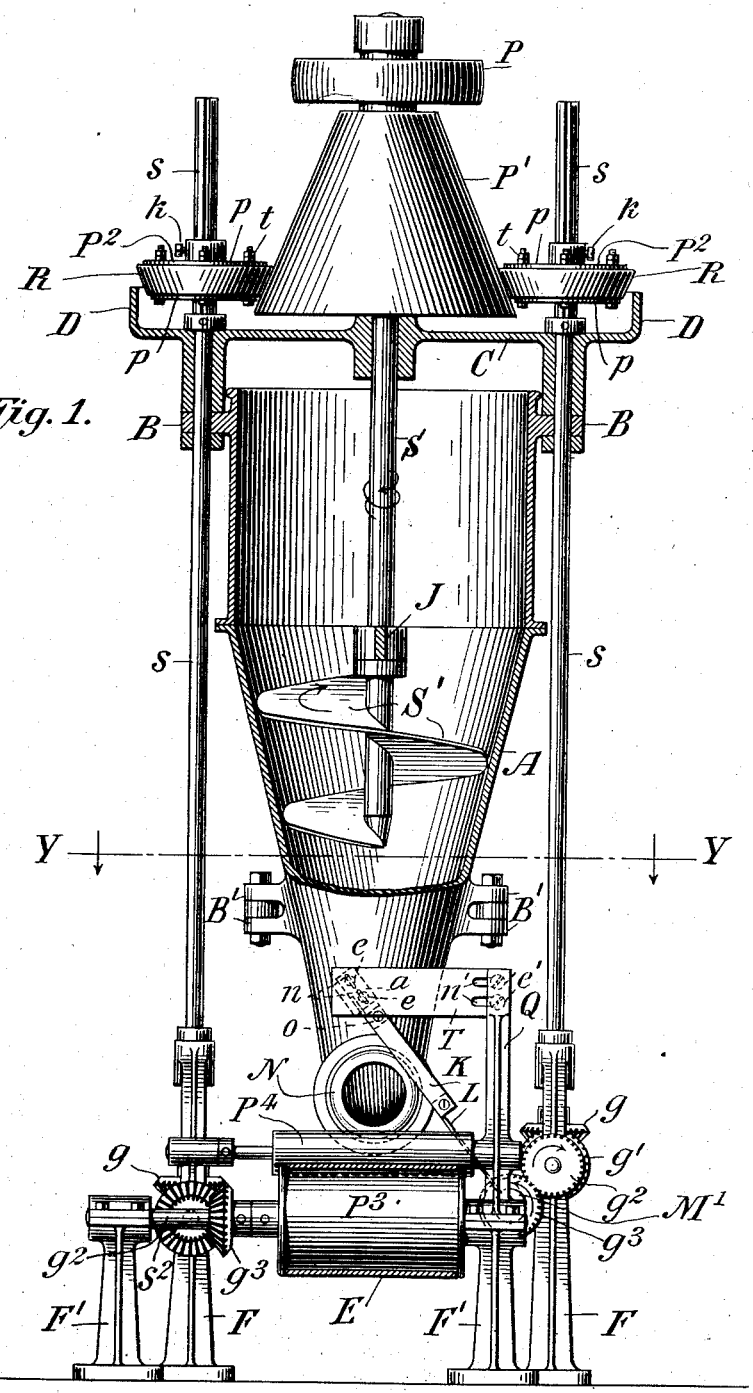

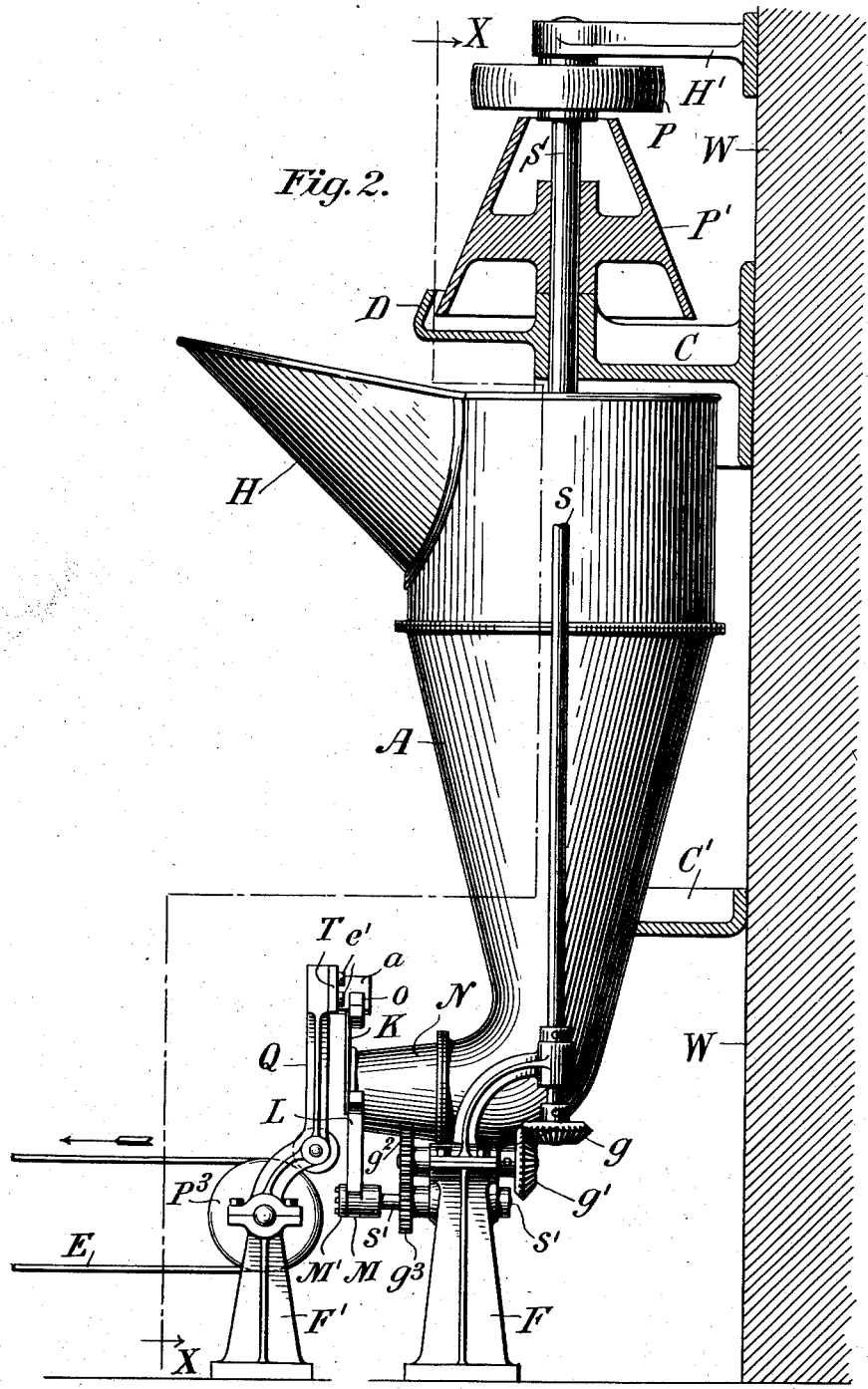

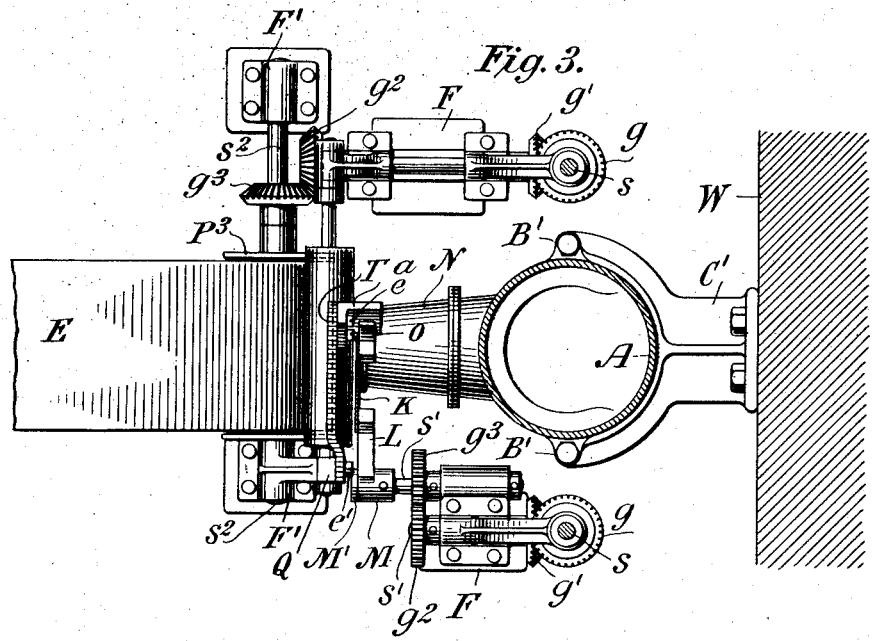
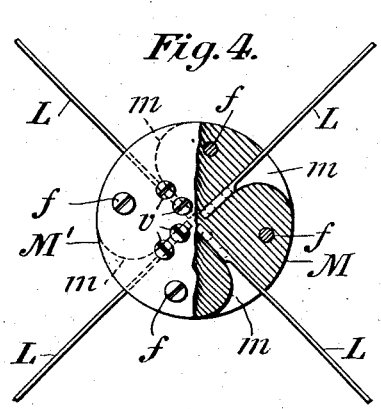
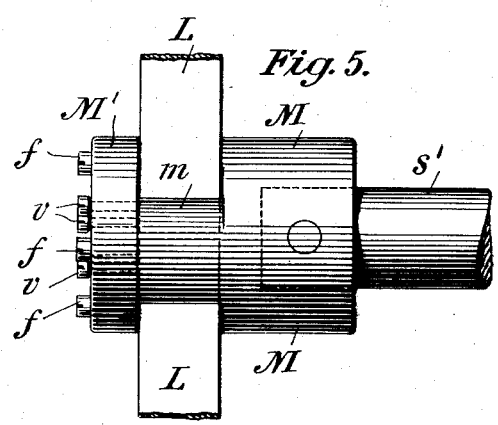
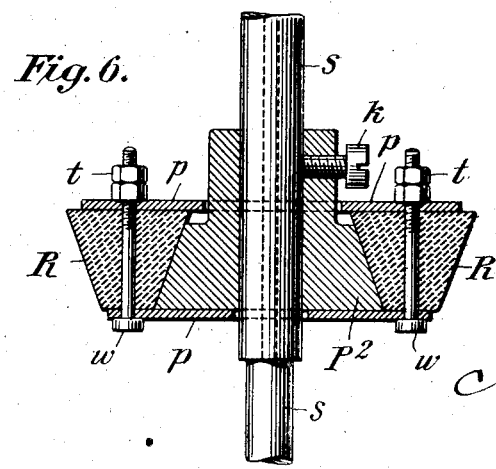

CHARLES J. KINTNER, OF NEW YORK, N. Y.

DOUGH-CUTTING MACHINE.

No. 902,088.  Specification of Letters Patent.  Patented Oct. 27, 1908.

Application filed November 6, 1903. Serial No. 180,134.

*To all whom it may concern:*

Be it known that I, CHARLES J. KINTNER, a citizen of the United States, residing at New York, borough of Manhattan, county and State of New York, have made a new and useful Invention in Dough-Cutting Machines, of which the following is a specification.

My invention is directed to improvements in machines for automatically cutting dough into parts of equal volume and weight and will be fully understood by referring to the accompanying drawings, in which, Figure 1 is a sectional view taken through the body of the machine on the broken line X—X Fig. 2 and as seen looking thereat from left to right in the direction of the arrows; and, Fig. 2 is a side elevational view of the complete machine, the wall supporting brackets and cone-shaped pulley for driving the dough cutting gearing and delivery belt being shown in sectional view. Fig. 3 is a transverse sectional view taken through Fig. 1 on the line Y—Y and as seen looking thereat from the top toward the bottom of the drawings in the direction of the arrows. Fig. 4 is an enlarged detail, part sectional, part elevational, view of the snap acting dough cutting apparatus, the knives not being shown; and Fig. 5 is a side elevational view thereof as seen looking at Fig. 4 from right to left. Fig. 6 is an enlarged detail sectional view taken through one of the adjustable cone-shaped pulleys which drive the snap acting dough cutting apparatus and the delivery belt.

Referring now to the drawings in detail in all of which like letters of reference represent like parts wherever used, F, F represent the legs which support from the floor the lower part of the mechanism and $F^1$, $F^1$ corresponding legs which support one of the delivery belt drums $P^3$ and additional parts of the machine.

C, $C^1$ are wall brackets for securing the machine to the wall W, the former provided with an oil retaining cup D which constitutes a partial cover to the entire machine and the latter supporting, by lugs $B^1$, $B^1$, the dough containing vessel or body portion A of the machine.

H is a feeding trough for delivering the dough to the interior of the machine and $H^1$ is a wall bracket which supports the upper end of the driving shaft S provided with a driving pulley P and a feeding worm or screw $S^1$, said shaft being journaled in a cross-bar J secured in the interior of the body portion A.

The upper portion of the body part A is secured by ears or lugs B to downwardly extending parts of the cup-shaped wall bracket C which parts also act as journal bearings for two rotary driving shafts $s$, $s$, provided at their lower ends with bevel gear-wheels $g$, $g$, connected through intermeshing gear-wheels $g^1$, $g^2$, $g^3$, one with a rotary shaft $s^1$ provided with an enlarged head or hub M and detachable cap $M^1$ supporting one or more detachable steel spring arms L adapted to carry at the outer end or ends one or more cutting knives K, and the other with a shaft $s^2$ supported by the legs $F^1$, $F^1$ and carrying a delivery belt drum $P^3$ adapted to carry one end of a delivery belt E moving in the direction of the arrow, Fig. 2. The lower part of the body portion A is of curvilinear form and is provided with a detachable discharge nozzle N secured thereto by bolts or other detachable means, the arrangement being such that any sized nozzle may be substituted, dependent upon the volume of dough it is desired to eject.

$P^4$ is a delivery roll journaled on one side in an extension Q of the leg $F^1$ and on the other side in a similar extension of one of the legs F, the function of said roll being to receive the dough as it advances from the nozzle N to the delivery belt E. To the upper end of the extension Q is secured by screws $e^1$ an arm T provided with adjustable slots $n^1$, $n^1$ for adjusting said arm laterally with relation to the extension Q. To the outer end of this arm is secured by screws $e$, $e$, in slots $n$, $n$, an inclined lug $a$ adapted to be adjusted with relation to a corresponding lug $o$ carried at the outer end of the snap acting cutting knife K so as to thereby vary the relative distance between said parts, as will be more particularly described in connection with the description of the mode of operation.

Referring now to Figs. 4 and 5 I will describe more particularly the manner of supporting the spring arms L, L which carry the cutting knives K, M being as before indicated a hub secured directly to the outer end of the shaft $s^1$. In the outer face of this hub is cut one or more slots or notches $m$, $m$, provided with curvilinear faces so arranged that when the spring arms L, L, L are secured to the hub and in the notches by the screws $v$, $v$, and after the cap $M^1$ is secured in position by the screws $f$, $f$, the inner ends of said arms will lie within the notches, so that when the shaft is rotated from left to right the spring arms L will curve around the curved portion of the notches and around the hub M when the cutting knives are held at their outer ends, thus placing the spring arms under tension.

Referring now to Fig. 6 I will describe the manner of varying the rate of speed of the machine so as to thereby vary the size or volume and weight of the pieces of dough to be cut. The upper ends of the two shafts $s$ are provided with splines. $P^2$ represents a cone-shaped metal body part of a pulley provided with a spline-groove adapted to fit either of said splines. $k$ is a set-screw for securing this body part $P^2$ at any desired position on the shafts $s$, $s$, with relation to the cone-shaped pulley $P^1$, preferably milled on its surface. R, R are soft rubber rings cone-shaped interiorly and exteriorly, as shown, and $p$, $p$ are face plates provided with central openings for fitting over the body part $P^2$ and the shaft $s$, $w$, $w$, being bolts and $t$, $t$, screw-nuts for firmly gripping said face-plates together in such manner as to vary the relative exterior diameters of the soft rubber cone-shaped rings R. As many of these rings of different diameters and body parts, etc. are provided for both of the shafts $s$, $s$ as may be deemed necessary to vary the size of the loaves or parts of dough and the corresponding rate of speed with which the delivery belt E shall be run, the exterior diameter of the rings R determining such speed and the corresponding variable diameters of the cone-shaped pulley $P^1$ varying the speed, as will be appreciated by an inspection of Fig. 1.

The operation is as follows—The body part A is filled with dough and the rings R, R of the desired diameter are secured in place upon the two shafts $s$, $s$, by set-screws $k$, $k$ after which the nuts $t$, $t$, are firmly secured so as to give to the rubber rings the desired frictional bearing with the cone-shaped driving pulley $P^1$. The machine is then set in motion through the agency of the pulley P rotating the shaft S in the direction of the curved arrow, see Fig. 1. The screw $S^1$ forces the dough forward out of the nozzle N and the two driving shafts $s$, $s$, drive respectively, one the snap acting cutting knife K and the other the delivery belt E. As the driving shaft $s'$ is rotated the knife K is also rotated until the lug $o$ at the outer end thereof comes into mechanical contact with the inclined lug $a$ and hence the knife supporting spring L is caused to be coiled up around the hub M, until finally the lug $o$ at the outer end of the knife K is released thereby imparting to the knife a sudden snap acting movement, instantly severing the dough as the knife passes the mouth of the nozzle N. The roll $P^4$ delivers the severed dough upon the delivery belt E and it passes forward to the baker. On the next revolution of the knife the lug $o$ at the outer end thereof comes again into contact with the lug $a$ and after it has moved a sufficient distance is again released and cuts off a second piece of dough of the same volume and weight as the piece previously severed, it being obvious that the rate of speed of the feed of the dough through the agency of the screw $S^1$ bears a fixed ratio to the speed of the knife operating apparatus, so that each piece of dough thus cut off must be identically the same in volume and weight as the piece preceding it. The adjustability of the arm T and lugs $a$ and $o$ also facilitate a more perfect and delicate operation of the machine, for the reason that when the snap acting cutting knife is adjusted radially it is found necessary to effect the adjustment of these parts to prevent the cutting edge of the knife from coming into contact with the material as it emerges from the nozzle N.

It is also obvious that the speed of the delivery belt E is varied by its cone-shaped driving ring R to correspond with the variation in speed of the knife cutting roll. As shown in Fig. 4 there may be arranged any number of knife supporting springs so that for each complete revolution of the hub M there will be cut four pieces of dough, each the exact duplicate of its predecessor; or, if preferred, two knives may be used, said knives being located diametrically opposite to each other. By using either a single knife carried by a single spring supporting arm L or arranging the knives thus supported in pairs in the manner shown in Fig. 4, I may vary the size of the loaves in multiple and by varying the size of the rings R, R for both the knife cutting and delivery apparatus and also the adjustment of arm T and lugs $o$ and $a$, or by varying the radial adjustment of the knife or knives through the agency of the radial sliding spring arms L, L, L and set-screws $v$, $v$, $v$, and the lateral adjustment of the arm T supported by the extension Q, I may vary the size of the loaves as desired, so that the apparatus, it will be apparent, is at once capable of cutting equal sized rolls or parts of any desired size.

It is also obvious that by reason of the adjustability of all of the parts of the apparatus variable sized loaves may be produced and variable speed feed of the material effected, and that the machine is particularly well adapted, by reason of its adjustability, to effect the instantaneous severing of the dough no matter what may be its viscosity, a feature of utility which is not required in machines for cutting butter or analogous substances.

It will also be noted that by reason of the snapping action of the cutting knives I am enabled to cut the dough clean and instantaneously without interfering with its flow from the nozzle N, thereby giving to all parts of the severed loaves or pieces an exact similarity of form, size and weight.

I am aware that it has heretofore been proposed to mold and cut butter and similar substances which change their density at different temperatures by a machine having a cylindrical chamber, a spiral or screw-threaded feeding device located therein and driven by a rotary shaft intergeared with a second shaft which carries a yielding knife adapted to be momentarily held before it reaches the outlet at the molding or forming end of the chamber, and in such manner as to be suddenly snapped past the same, and I make no claim broadly to such a structural apparatus.

Having thus described my invention what I claim and desire to secure by Letters Patent of the United States is—

1. A dough cutting machine provided with feeding mechanism for feeding the dough continuously forward; snap acting cutting mechanism for cutting the same into equal parts and variable speed gear for varying the intervals of said snap acting cutting mechanism; in combination with variable speed gear operatively connected to the feeding mechanism and to delivery mechanism for delivering the severed dough at some distant point.

2. A dough cutting machine provided with a rotary shaft, a feeding worm or screw, and yielding snap acting mechanism detachably secured in a slot or slots in the end of said shaft; in combination with stationary means located in the path of the free end of the cutting mechanism; together with interchangeable, variable speed gear for connecting the cutting mechanism with the feeding worm or screw.

3. A dough cutting machine provided with a rotary shaft carrying a feeding worm or screw; snap acting cutting mechanism secured to a second shaft geared to said shaft; in combination with interchangeable, variable speed gear for varying the relative rotation of the cutting mechanism to the feeding mechanism; together with means located in the path of the cutting mechanism for giving to it the snap acting effect.

4. A dough cutting machine provided with a nozzle; means connected to a rotary shaft for forcing the dough therethrough at a definite rate of speed; rotary cutting means adjacent to the nozzle and connected through shafting gearing and two cone-shaped pulleys to the same source of power which drives the first-named rotary shaft, one of the cone-shaped pulleys having a yielding cone-shaped ring and means for adjusting it frictionally against the face of the other.

5. A dough cutting machine provided with a nozzle; power driven means for forcing the dough therethrough; cutting mechanism adjacent to the nozzle for successively cutting the dough as it emerges therefrom into proportionate lengths; means for delivering the severed dough at a distant point; interconnected gearing and shafting between the cutting mechanism and the delivering mechanism operatively connected through two cone-shaped pulleys with a single cone-shaped driving pulley carried by the same shaft which operates the dough forcing mechanism, the cone-shaped driven pulleys being each provided with a yielding cone-shaped ring and means for adjusting the same frictionally against the face of the common driving pulley.

6. A dough cutting machine provided with feeding mechanism for feeding the dough continuously forward; snap acting cutting mechanism for cutting the same into equal parts, and adjustable means for varying the intervals of action of said snap acting cutting mechanism; in combination with delivery mechanism for delivering the severed dough at some distant point, and means for varying the speed of the delivery mechanism.

7. A dough cutting machine provided with feeding mechanism operatively connected with a source of power, as a pulley; a discharge nozzle and snap acting cutting mechanism operatively connected to the same source of power; together with adjustable means for varying the speed with which such snap acting cutting mechanism acts.

8. A dough cutting machine provided with feeding mechanism operatively connected with a source of power; a discharge nozzle; snap acting cutting mechanism for severing the dough into equal parts; delivery mechanism for delivering the severed dough at some distant point, said snap acting cutting mechanism and delivery mechanism being operatively connected to the same source of power as the feeding mechanism and provided with adjustable means for varying the relative speed thereof.

9. A dough cutting machine embracing a dough containing vessel provided with a discharge nozzle; feeding mechanism located within the nozzle; a snap acting cutting knife adapted to sever the dough into equal parts as it is delivered from the nozzle; a source of power operatively connected with said feeding mechanism and snap acting mechanism, and adjustable means for varying the speed with which the snap acting mechanism severs the dough.

10. A dough cutting machine embracing a dough containing vessel provided with a discharge nozzle; feeding mechanism located within the vessel and operatively connected to a source of power; a snap acting cutting knife adapted to sever the dough into equal parts as it is delivered from the discharge nozzle; delivery mechanism for delivering the dough as thus severed to some distant point; interconnecting mechanism between the snap acting cutting mechanism, the delivery mechanism and the same source of power which drives the feeding mechanism, and adjustable means for varying the speed of the snap acting cutting mechanism and the delivery mechanism.

In testimony whereof I have signed my name to this specification in the presence of two subscribing witnesses.

CHARLES J. KINTNER.

Witnesses:
 JAMES P. J. MORRIS,
 M. F. KEATING.